(12) United States Patent
Yang et al.

(10) Patent No.: US 8,124,899 B2
(45) Date of Patent: Feb. 28, 2012

(54) KEY ASSEMBLY AND PORTABLE ELECTRONIC DEVICE USING THE SAME

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 377 days.

(21) Appl. No.: 12/488,722

(22) Filed: Jun. 22, 2009

(65) Prior Publication Data
US 2010/0039760 A1 Feb. 18, 2010

(30) Foreign Application Priority Data
Aug. 15, 2008 (CN) .......................... 2008 1 0303861

(51) Int. Cl.
*H01H 3/12* (2006.01)
(52) U.S. Cl. ................... 200/341; 361/679.08
(58) Field of Classification Search .................. 200/5 A, 200/341, 339, 343; 361/679.08, 679.09
See application file for complete search history.

(56) References Cited

U.S. PATENT DOCUMENTS

| 4,351,995 | A | * | 9/1982 | Inoue et al. | 200/535 |
|---|---|---|---|---|---|
| 4,472,610 | A | * | 9/1984 | Fuller et al. | 200/5 A |
| 4,689,455 | A | * | 8/1987 | Watanabe | 200/534 |
| 5,329,278 | A | * | 7/1994 | Dombroski | 341/20 |
| 5,581,251 | A | * | 12/1996 | McRight et al. | 341/22 |
| 6,212,066 | B1 | * | 4/2001 | Fetterman | 361/679.17 |
| 6,781,071 | B2 | * | 8/2004 | Leng et al. | 200/61.54 |
| 7,138,592 | B2 | * | 11/2006 | Lau et al. | 200/339 |
| 7,601,927 | B2 | * | 10/2009 | Egea Soler | 200/315 |
| 2009/0301853 | A1 | * | 12/2009 | Yang et al. | 200/343 |
| 2010/0046153 | A1 | * | 2/2010 | Yang et al. | 361/679.09 |
| 2010/0053872 | A1 | * | 3/2010 | Yang et al. | 361/679.09 |
| 2010/0128460 | A1 | * | 5/2010 | Yang et al. | 361/837 |
| 2010/0134965 | A1 | * | 6/2010 | Yang et al. | 361/679.08 |

* cited by examiner

*Primary Examiner* — Vanessa Girardi
(74) *Attorney, Agent, or Firm* — Altis Law Group, Inc.

(57) ABSTRACT

A key assembly comprises a base plate and two keys. The base plate has an opening defined therein and two opposite first inner walls formed in the opening, each first inner wall has two mating space defined therein and spaced from each other. Each key has two opposite sidewalls, each sidewall has a shaft protruding therefrom and corresponding to the mating spaces, the shafts is rotatably received in the mating spaces.

14 Claims, 4 Drawing Sheets

KEY ASSEMBLY AND PORTABLE ELECTRONIC DEVICE USING THE SAME

This application is related to U.S. patent application Ser. No. 12/502,297 (US 2010/0046153), entitled "KEY ASSEMBLY AND PORTABLE ELECTRONIC DEVICE USING THE SAME", by Mu-Wen Yang et al. Such application has the same assignee as the present application and has been concurrently filed herewith. The above-identified application is incorporated herein by reference.

BACKGROUND

1. Technical Field

The exemplary disclosure generally relates to key assemblies, and particularly to key assemblies used in portable electronic devices.

2. Description of Related Art

With the development of smaller and lighter electronic devices for portable use, key assemblies have become more compact with keys more tightly spaced. Unfortunately, users of these portable electronic sometimes experience difficulty in pressing keys that are placed so close together; users may easily press more than one key at a time or press a wrong key. This drawback exists for users of cellular telephones and other portable electronic devices with key assemblies.

Thus, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary key assembly and portable electronic device using key assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
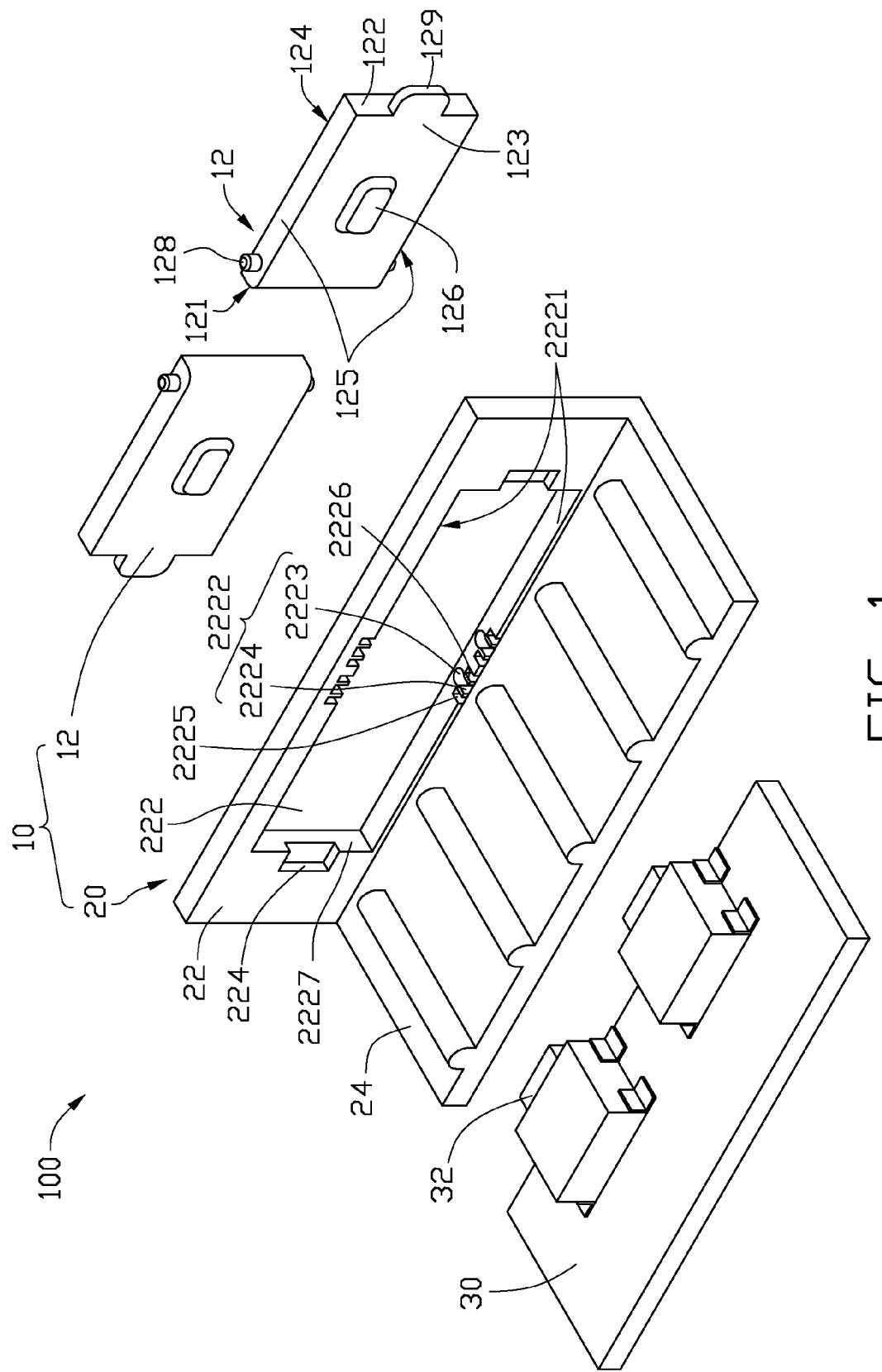
FIG. 1 is an exploded, isometric view of one embodiment of a key assembly used in a portable electronic device, the portable electronic device including the key assembly, a housing, and a circuit board.
Figure 2:
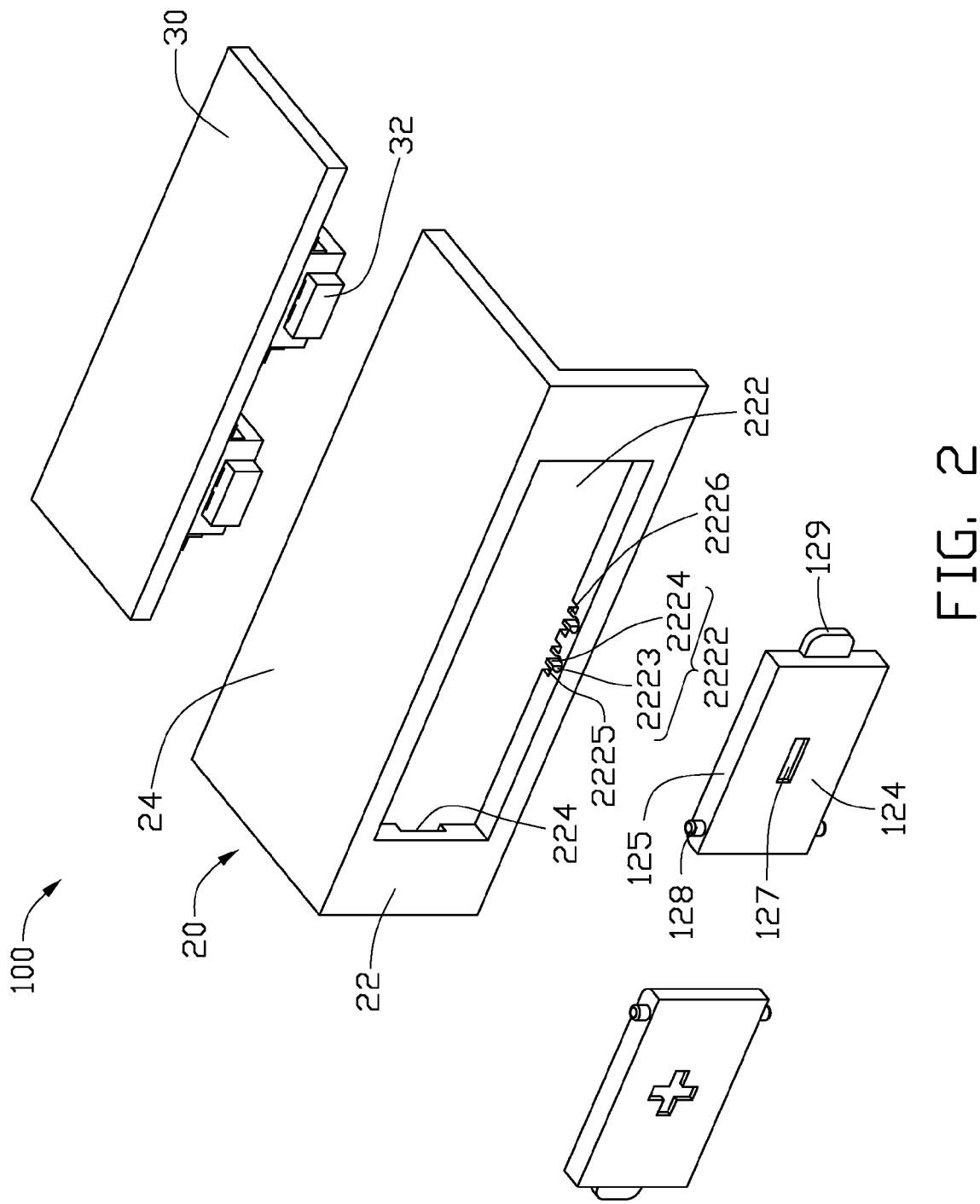
FIG. 2 is similar to FIG. 1, but showing the portable electronic device in another aspect.
Figure 3:
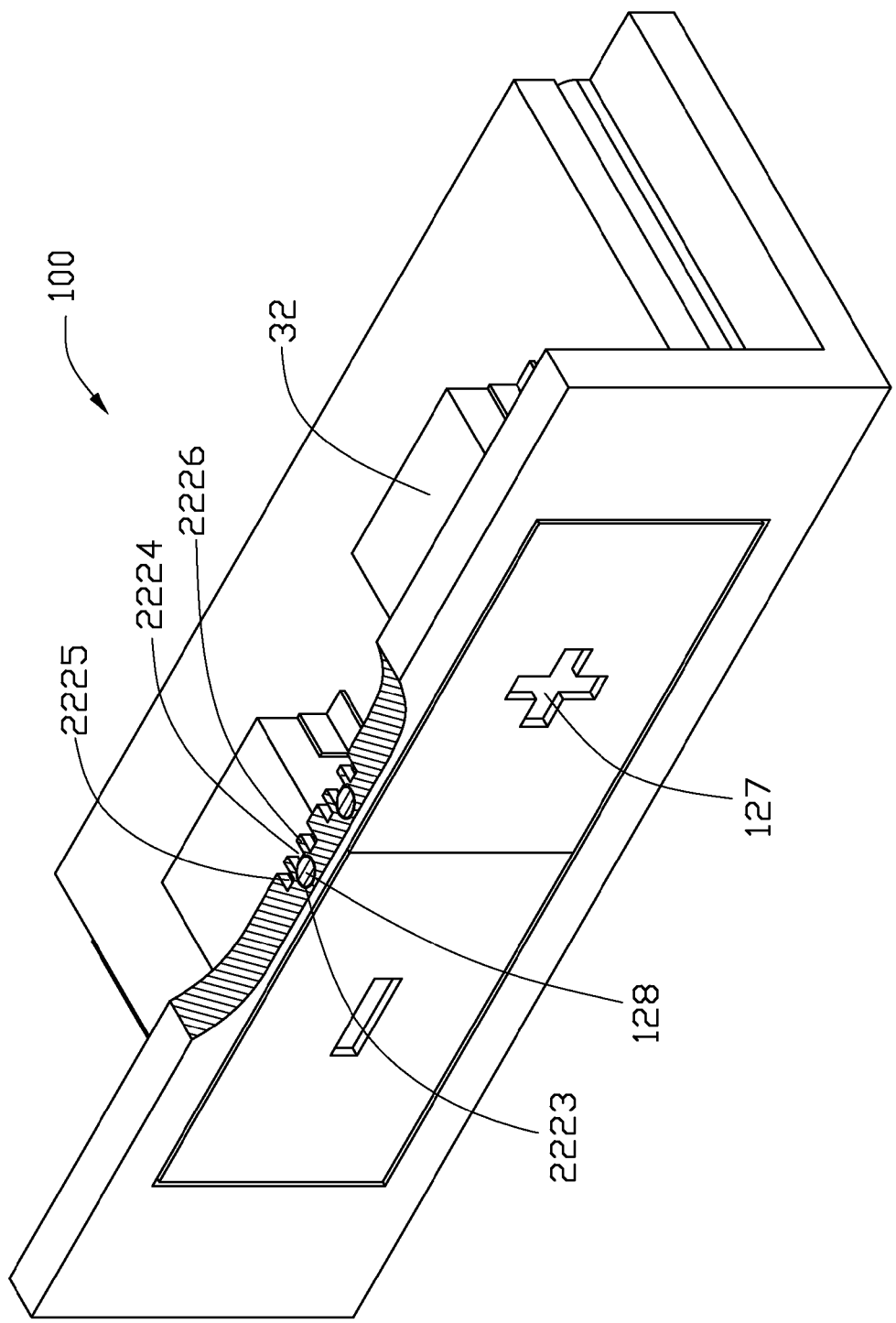
FIG. 3 is a cutaway, assembled view of the portable electronic device shown in FIG. 1.

Referring to FIGS. 1 to 3, an exemplary embodiment of a key assembly 10 can be used in a portable electronic device 100, such as a cellular phone or any electronic device where a key is desirable. The portable electronic device 100 includes a circuit board 30 and a key assembly 10 configured to control the circuit board 30. The circuit board 30 has two spaced apart switches 32 mounted thereon. The key assembly 10 is configured so that pressing of the first switches 32 can control the circuit board 30.

The key assembly 10 includes a base plate 20 and keys 12 corresponding to the switches 32. The base plate 20 may be a portion of a housing of the portable electronic device 100 or may be a separate element mounted to a housing of the portable electronic device 100. In this embodiment, the base plate 10 is a portion of a housing of the portable electronic device 100. Each key 12 may have any shape. Each key 12 has a first end 121 located adjacent to another key 12, a second end 122 opposite to the first end 121, a contacting surface 123 facing the circuit board 30, an operating surface 124 opposite to the contacting surface 123 and two opposite sidewalls 125 connecting the contacting surface 123 to the operating surface 124.

Each contacting surface 123 has a contacting portion 126 protruding from the center thereof. The contacting portions 126 are configured for triggering the switches 32, correspondingly. The contacting portions 126 may be constructed from injection-molded thermoplastic elastomer and configured to produce a point contact sensation in a user's fingertip to provide tactile feedback when a user presses the key 12. The operating surface 124 may have an indicia 127 defined thereon, to indicate the function of the first key 12. The indicia 127 may be, e.g., "+" or "−", to indicate the functions of the keys 12 are increasing volume or decreasing volume, correspondingly.

Each sidewall 125 has a shaft 128 protruding therefrom adjacent to the first end 121, and the shafts 128 are coaxial. Each key 12 has a stopping section 129 protruding from the second end 122 thereof. The stopping sections 129 are configured for preventing the keys 12 from detaching from the base plate 20.

The base plate 20 includes a peripheral wall 22 and a bottom wall 24 substantially perpendicularly connected to the peripheral wall 22. The peripheral wall 22 has an opening 222 defined therein corresponding to the keys 12. The opening 222 is sized and configured to be engaged with the key 12. The base plate 20 includes two opposite first inner walls 2221 and two opposite second inner walls 2227 bounding the opening 222.

The first inner walls 2221 are parallel to the bottom wall 24, and each first inner wall 2221 has two mating spaces 2222 defined therein and spaced from each other. Each mating space 2222 includes a aperture 2223 defined in a center of the first inner wall 2221 and a guiding groove 2224 defined in an inner surface of the peripheral wall 22. The cross-section of the aperture 2223 is the same size and shape as the shaft 128 and is configured to accommodate the shaft 128 therein. The cross-section of the guiding groove 2224 is rectangular and communicates with the aperture 2223. The width of the guiding groove 2224 is smaller than the diameter of the shaft 128. The guiding groove 2224 is configured to guide the shaft 128 into the aperture 2223.

Each first inner wall defines a notch 2225 adjacent two opposite sides of each guiding groove 2224, thus forming two expanding portions 2226 between each notch 2225 and nearest guiding groove 2224. When the shafts 128 move into the guiding grooves 2224, the expanding portions 2226 are bent toward the notches 2225 to enlarge the width of the guiding grooves 2224 such that the shafts 128 easily enter into the apertures 2223. Each second inner wall 2227 has a trough 224 defined therein, and the troughs 224 communicate with an inner surface of the peripheral wall 22. The troughs 224 are configured for accommodating the stopping sections 129 of the keys 12.

Figure 4:
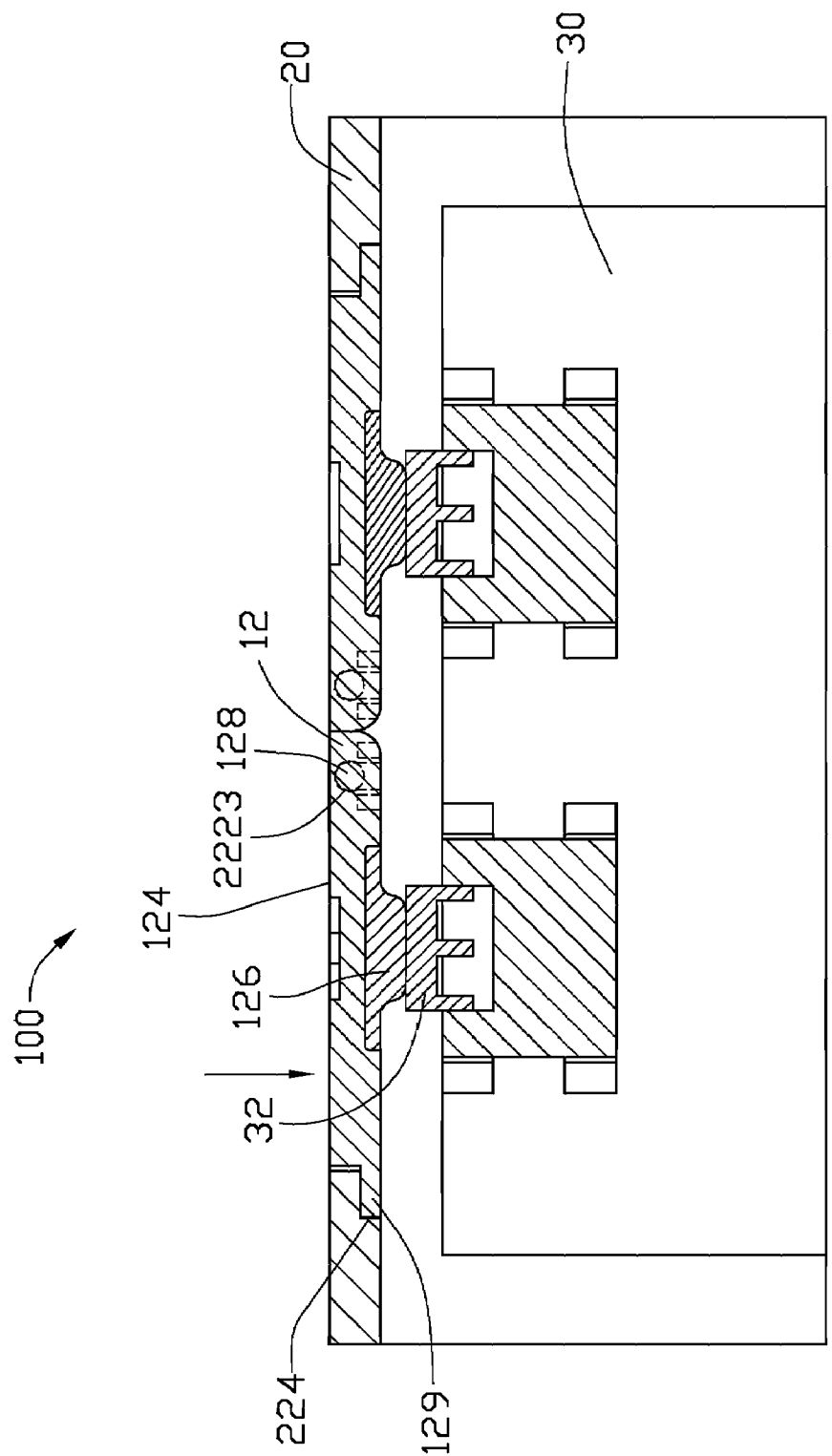
FIG. 4 is a cross-sectional view of the portable electronic device shown in FIG. 3.

Referring to FIGS. 3 and 4, to assemble the portable electronic device, first, the shafts 128 are aligned with the guiding grooves 2224, and the stopping sections 129 are aligned with the troughs 224. Second, the keys 12 are pressed such that the shafts 128 are moved in the guiding grooves 2224 until the shafts 128 are accommodated in the aperture 2223, correspondingly. At this time, the stopping sections 129 are accommodated in the troughs 224. Then, the circuit board 30 is attached to the bottom wall 24 with the switches 32 correspondingly resisting against the contacting portions 126, thus yielding an assembled portable electronic device 100.

Referring further to FIG. 4, to use the key assembly 10, first, the second ends 122 of the keys 12 are pressed toward the switches of the circuit board 30, so the keys 12 are rotated about the shafts 128 to enter into the base plate 20 until the contacting portions 126 trigger the switches 32 to control the circuit board 30. At this time, the contacting portions 126 and the switches 32 are compressed to accumulate elastic force, and the stopping sections 129 are out of the troughs 224. Once the switches 32 are triggered, the keys 12 are released so that the keys 12 rebounded until the stopping sections 129 are accommodated in the troughs 224 again.

Because the second ends 122 of the keys 12 are pressed when using the keys 12, and each second end 122 faces away from another key 12, a user's fingertip touches only one key 12 at a time, thus removing the possibility of hitting two keys at once.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A key assembly comprising:
a base plate, the base plate defining an opening having two opposite first inner walls, each first inner wall having two mating spaces defined therein and spaced from each other; and
two keys received in the opening, each key having two opposite sidewalls, each sidewall having a shaft protruding therefrom and corresponding to the mating spaces; wherein each mating space includes a aperture defined in the center of the first inner wall, the shafts are rotatably accommodated in the aperture.

2. The key assembly of claim 1 wherein each key has a first end and a second end located opposite to the first end, the shafts is located adjacent to the first end, the second end has a stopping portion protruding outwardly, the base plate has a trough defined therein and corresponding to the stopping portion, the stopping portion is latched in the trough to prevent the second end from detaching from the opening.

3. The key assembly of claim 1 wherein the base plate includes a peripheral wall and a bottom wall connecting with the peripheral wall, the opening is defined in the peripheral wall.

4. The key assembly of claim 1 wherein the shafts of each key are coaxial.

5. The key assembly of claim 1, wherein each mating space further includes a guiding groove defined in an inner surface of the peripheral wall communicating with corresponding aperture, the guiding grooves are configured to guide the shafts into the apertures.

6. The key assembly of claim 5 wherein the width of the guiding grooves are smaller than the diameter of the shafts.

7. The key assembly of claim 6 wherein each side of each guiding groove has a notch defined therein, so four expanding portions are defined between the notches and the guiding grooves, when the shafts move in the guiding grooves, the expanding portions are bent toward the notches to enlarge the width of the guiding grooves.

8. A portable electronic device, comprising:
a circuit board having switches mounted thereon; and a key assembly including:
a base plate, the base plate defining an opening having two opposite first inner walls, each first inner wall having two mating spaces defined therein and spaced from each other; and
two keys used to control the switches of the circuit board, each key having two opposite sidewalls, each sidewall having a shaft protruding therefrom and corresponding to the mating spaces; wherein each mating space includes a aperture defined in the center of the first inner wall, the shafts are rotatably accommodated in the aperture.

9. The portable electronic device of claim 8 wherein each key has a first end and a second end located opposite to the first end, the shafts is located adjacent to the first end, the second end has a stopping portion protruding outwardly, the base plate has a trough defined therein and corresponding to the stopping portion, the stopping portion is latched in the trough to prevent the second end from detaching from the opening.

10. The key assembly of claim 8 wherein the base plate includes a peripheral wall and a bottom wall connecting with the peripheral wall, the opening is defined in the peripheral wall.

11. The key assembly of claim 8 wherein the shafts of each key are coaxial.

12. The portable electronic device of claim 8, wherein each mating space further includes a guiding groove defined in an inner surface of the peripheral wall communicating with corresponding aperture, the guiding grooves are configured to guide the shafts into the apertures.

13. The portable electronic device of claim 12 wherein the width of the guiding grooves are smaller than the diameter of the shafts.

14. The portable electronic device of claim 13 wherein each side of each guiding groove has a notch defined therein, so four expanding portions are defined between the notches and the guiding grooves, when the shafts move in the guiding grooves, the expanding portions are bent toward the notches to enlarge the width of the guiding grooves.

* * * * *